United States Patent
Zhou et al.

(10) Patent No.: US 12,452,945 B2
(45) Date of Patent: *Oct. 21, 2025

(54) BEAM FAILURE REPORT RESPONSE RECEIVING CELL RESTRICTION RULE

(71) Applicant: QUALCOMM Incorporated, San Diego, CA (US)

(72) Inventors: Yan Zhou, San Diego, CA (US); Hamed Pezeshki, San Diego, CA (US); Tao Luo, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/618,845

(22) Filed: Mar. 27, 2024

(65) Prior Publication Data

US 2024/0381470 A1    Nov. 14, 2024

Related U.S. Application Data

(63) Continuation of application No. 17/096,873, filed on Nov. 12, 2020, now Pat. No. 11,974,344.

(Continued)

(51) Int. Cl.
*H04W 76/18*     (2018.01)
*H04L 41/0668*   (2022.01)
(Continued)

(52) U.S. Cl.
CPC ......... *H04W 76/18* (2018.02); *H04L 41/0668* (2013.01); *H04W 72/20* (2023.01); *H04W 72/0453* (2013.01)

(58) Field of Classification Search
CPC . H04W 76/18; H04W 76/19; H04W 72/0406; H04W 72/0453; H04W 72/20;
(Continued)

(56) References Cited

U.S. PATENT DOCUMENTS 11,564,168 B2    1/2023  Cheng et al.
12,231,212 B2 *  2/2025  Yang .............. H04W 16/28
(Continued)

FOREIGN PATENT DOCUMENTS

WO   2015123051 A1   8/2015
WO   2019135654 A1   7/2019

OTHER PUBLICATIONS

Convida Wireless: "On Beam Failure Recovery for SCell", 3GPP Draft, 3GPP TSG-RAN WG1 #99, R1-1913140, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 9, 2019 (Nov. 9, 2019), XP051823779, pp. 1-6, the whole document.

(Continued)

*Primary Examiner* — Oussama Roudani

(57) ABSTRACT

Certain aspects of the present disclosure provide techniques for reporting and responding to beam failure events based on a receiving cell restriction rule. An example method includes detecting an occurrence of a threshold number of beam failures for a connection between the UE and a set of cells; identifying a candidate beam for restoring the connection between the UE and the set of cells in response to detecting the occurrence of the threshold number of beam failures; transmitting, to one or more cells in the set of cells, a beam failure recovery (BFR) request including an identification of the candidate beam; receiving, from a cell in the set of cells, a BFR response in response to transmitting the BFR request, wherein the BFR response is received according to a restriction rule; and resuming communications with the set of cells based on the BFR response.

20 Claims, 12 Drawing Sheets

Related U.S. Application Data

(60) Provisional application No. 62/936,390, filed on Nov. 15, 2019.

(51) Int. Cl.
*H04W 72/0453* (2023.01)
*H04W 72/20* (2023.01)

(58) Field of Classification Search
CPC ... H04L 41/0668; H04B 7/088; H04B 7/0695; H04B 7/0619
See application file for complete search history.

(56) References Cited

U.S. PATENT DOCUMENTS

| | | | |
|---|---|---|---|
| 2015/0230157 A1 | 8/2015 | Rattner et al. | |
| 2019/0028174 A1* | 1/2019 | Chakraborty | H04L 27/2613 |
| 2019/0190582 A1 | 6/2019 | Guo et al. | |
| 2019/0253308 A1 | 8/2019 | Huang et al. | |
| 2020/0259703 A1 | 8/2020 | Cirik et al. | |
| 2021/0050904 A1 | 2/2021 | Cirik et al. | |
| 2021/0051754 A1 | 2/2021 | Zhou et al. | |
| 2021/0068162 A1 | 3/2021 | Agiwal et al. | |
| 2021/0153074 A1 | 5/2021 | Yang et al. | |
| 2021/0153284 A1 | 5/2021 | Zhou et al. | |
| 2021/0314051 A1 | 10/2021 | Yang et al. | |
| 2021/0320711 A1 | 10/2021 | Lee et al. | |
| 2022/0006686 A1 | 1/2022 | Chen et al. | |
| 2022/0286183 A1 | 9/2022 | Yi et al. | |
| 2022/0345267 A1 | 10/2022 | Zhou et al. | |
| 2023/0170979 A1* | 6/2023 | Kang | H04B 7/061 375/347 |

OTHER PUBLICATIONS

Huawei, et al., "Beam Failure Recovery for Scell", 3GPP Draft, R1-1813561, 3GPP TSG RAN WG1 Meeting #95, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 3, 2018 (Nov. 3, 2018), XP051479899, 7 Pages, 2.1 Scenario for beam failure recovery for SCell, figure 4 2.2.2, New candidate beam identification, 2.2.3 Beam failure recovery (BFRQ).
International Preliminary Report on Patentability—PCT/US2020/060487—The International Bureau of WIPO—Geneva, Switzerland—May 27, 2022.
International Search Report and Written Opinion—PCT/US2020/060487—ISA/EPO—Feb. 10, 2021.

* cited by examiner

BEAM FAILURE REPORT RESPONSE RECEIVING CELL RESTRICTION RULE

CROSS-REFERENCE TO RELATED APPLICATIONS

This application is a continuation of U.S. application Ser. No. 17/096,873, filed Nov. 12, 2020, entitled "Beam Failure Report Response Receiving Cell Restriction Rule," which claims benefit of and priority to U.S. Provisional Application No. 62/936,390, filed Nov. 15, 2019, entitled "Beam Failure Report Response Receiving Cell Restriction Rule," and assigned to the assignee hereof, the contents of which are both hereby expressly incorporated by reference herein in their entireties as if fully set forth below and for all applicable purposes.

BACKGROUND

Field of the Disclosure

Aspects of the present disclosure relate to wireless communications, and more particularly, to techniques for responding to beam failure reporting based on a cell restriction rule.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved beam responses to beam failure reporting.

Certain aspects of the subject matter described herein can be implemented in a method for wireless communication by a user equipment (UE). The method generally includes detecting an occurrence of a threshold number of beam failures for a connection between the UE and a failed cell in a set of cells; identifying a candidate beam for restoring the connection between the UE and the set of cells in response to detecting the occurrence of the threshold number of beam failures; transmitting, to one or more cells in the set of cells, a beam failure recovery (BFR) request including an identification of the candidate beam; receiving, from a cell in the set of cells, a BFR response in response to transmitting the BFR request, wherein the BFR response is received according to a restriction rule; and resuming communications with the set of cells based on the BFR response.

Certain aspects of the subject matter described herein can be implemented in a method for wireless communication by a network entity. The method generally includes receiving, from a user equipment (UE), a beam failure recovery (BFR) request including an identification of a candidate beam; generating a BFR response based on the identified candidate beam; transmitting, to the UE, the BFR response based on a restriction rule; and communicating with the UE based on the identified candidate beam.

Aspects of the present disclosure provide means for, apparatus, processors, and computer-readable mediums for performing the methods described herein.

Aspects of the present disclosure provide means for, apparatus, processors, and computer-readable mediums for performing techniques and methods that may be complementary to the operations by the UE described herein, for example, by a BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
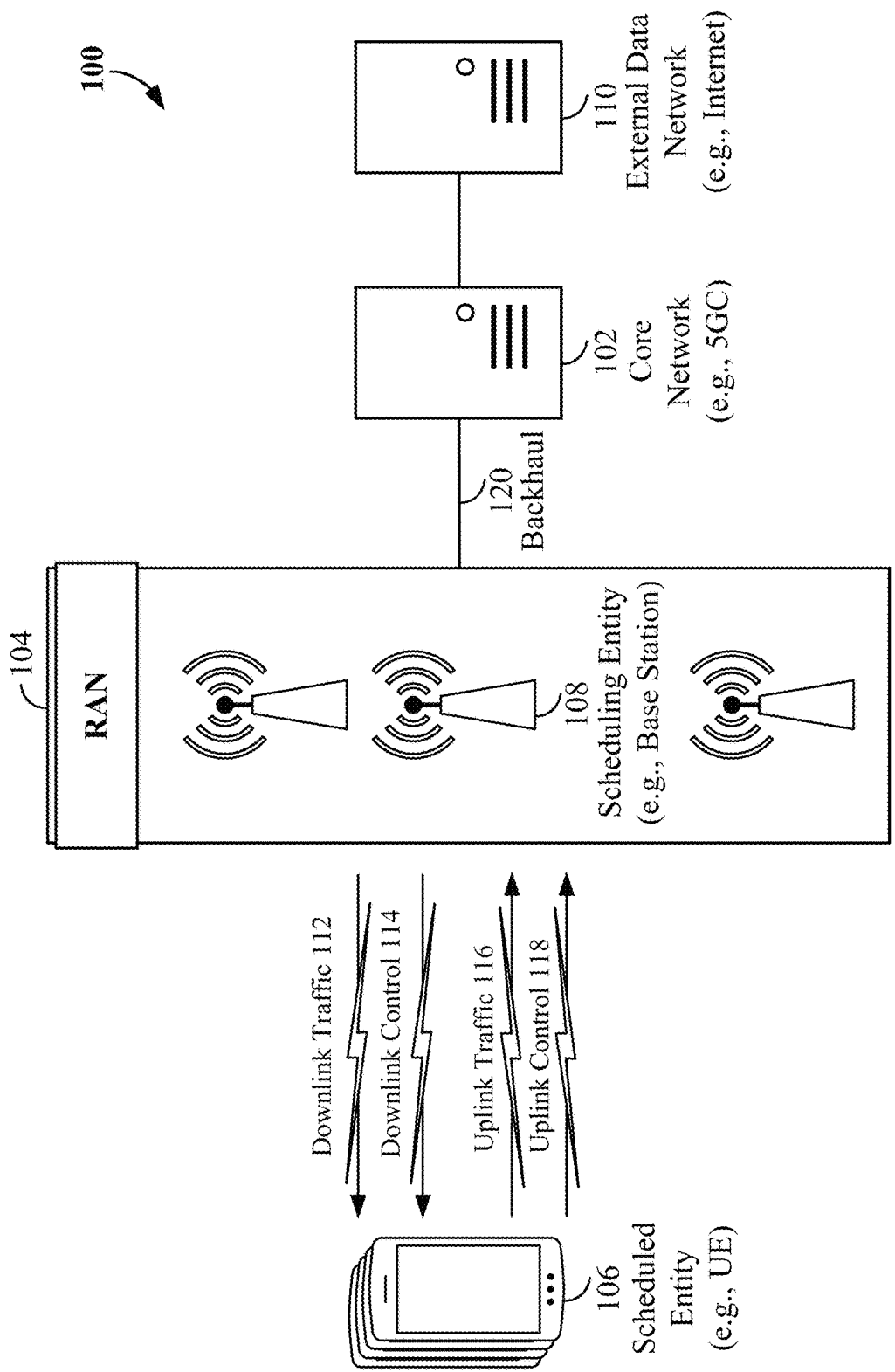
FIG. 1 is a schematic illustration of a wireless communication system according to some aspects.

Aspects of the present disclosure provide apparatus, methods, processing systems, and computer readable mediums for beam failure reporting and responses based on receiving cell restriction rules.

The following description provides examples of beam failure reporting and responses based on receiving cell restriction rules in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth, millimeter wave mmW, massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QOS) requirements. In addition, these services may co-exist in the same subframe.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

RAT: radio access technology. The type of technology or communication standard utilized for radio access and communication over a wireless air interface. Just a few examples of RATs include GSM, UTRA, E-UTRA (LTE), Bluetooth, and Wi-Fi.

NR: new radio. Generally refers to 5G technologies and the new radio access technology undergoing definition and standardization by 3GPP in Release 15.

Legacy compatibility: may refer to the capability of a 5G network to provide connectivity to pre-5G devices, and the capability of 5G devices to obtain connectivity to a pre-5G network.

Multimode device: a device that can provide simultaneous connectivity across different networks, such as 5G, 4G, and Wi-Fi networks.

CA: carrier aggregation. 5G networks may provide for aggregation of sub-6 GHz carriers, above-6 GHz carriers, mmWave carriers, etc., all controlled by a single integrated MAC layer.

MR-AN: multi-RAT radio access network. A single radio access network may provide one or more cells for each of a plurality of RATs, and may support inter- and intra-RAT mobility and aggregation.

MR-CN: multi-RAT core network. A single, common core network may support multiple RATs (e.g., 5G, LTE, and WLAN). In some examples, a single 5G control plane may support the user planes of a plurality of RATs by utilizing software-defined networking (SDN) technology in the core network.

SDN: software-defined networking. A dynamic, adaptable network architecture that may be managed by way of abstraction of various lower-level functions of a network, enabling the control of network functions to be directly programmable.

SDR: software-defined radio. A dynamic, adaptable radio architecture where many signal processing components of a radio such as amplifiers, modulators, demodulators, etc. are replaced by software functions. SDR enables a single radio device to communicate utilizing different and diverse waveforms and RATs simply by reprogramming the device.

mmWave: millimeter-wave. Generally refers to high bands above 24 GHZ, which can provide a very large bandwidth.

Beamforming: directional signal transmission or reception. For a beamformed transmission, the amplitude and phase of each antenna in an array of antennas may be precoded, or controlled to create a desired (e.g., directional) pattern of constructive and destructive interference in the wavefront.

MIMO: multiple-input multiple-output. MIMO is a multi-antenna technology that exploits multipath signal propagation so that the information-carrying capacity of a wireless link can be multiplied by using multiple antennas at the transmitter and receiver to send multiple simultaneous streams. At the multi-antenna transmitter, a suitable precoding algorithm (scaling the respective streams' amplitude and phase) is applied (in some examples, based on known channel state information). At the multi-antenna receiver, the different spatial signatures of the respective streams (and, in some examples, known channel state information) can enable the separation of these streams from one another.

In single-user MIMO, the transmitter sends one or more streams to the same receiver, taking advantage of capacity gains associated with using multiple Tx, Rx antennas in rich scattering environments where channel variations can be tracked.

The receiver may track these channel variations and provide corresponding feedback to the transmitter. This feedback may include channel quality information (CQI), the number of preferred data streams (e.g., rate control, a rank indicator (RI)), and a precoding matrix index (PMI).

Massive MIMO: a MIMO system with a very large number of antennas (e.g., greater than an 8×8 array).

MU-MIMO: a multi-antenna technology where base station, in communication with a large number of UEs, can exploit multipath signal propagation to increase overall network capacity by increasing throughput and spectral efficiency, and reducing the required transmission energy.

The transmitter may attempt to increase the capacity by transmitting to multiple users using its multiple transmit antennas at the same time, and also using the same allocated time-frequency resources. The receiver may transmit feedback including a quantized version of the channel so that the transmitter can schedule the receivers with good channel separation. The transmitted data is precoded to maximize throughput for users and minimize inter-user interference.

AS: access stratum. A functional grouping consisting of the parts in the radio access network and in the UE, and the protocols between these parts being specific to the access technique (i.e., the way the specific physical media between the UE and the radio access network is used to carry information).

NAS: non-access stratum. Protocols between UE and the core network that are not terminated in the radio access network.

RAB: radio access bearer. The service that the access stratum provides to the non-access stratum for transfer of user information between a UE and the core network.

Network slicing: a wireless communication network may be separated into a plurality of virtual service networks (VSNs), or network slices, which are separately configured to better suit the needs of different types of services. Some wireless communication networks may be separated, e.g., according to eMBB, IoT, and URLLC services.

eMBB: enhanced mobile broadband. Generally, eMBB refers to the continued progression of improvements to existing broadband wireless communication technologies such as LTE. eMBB provides for (generally continuous) increases in data rates and increased network capacity.

IoT: the Internet of things. In general, this refers to the convergence of numerous technologies with diverse use cases into a single, common infrastructure. Most discussions of the IoT focus on machine-type communication (MTC) devices.

URLLC: ultra-reliable and low-latency communication. Sometimes equivalently called mission-critical communication. Reliability refers to the probability of success of transmitting a given number of bytes within 1 ms under a given channel quality. Ultra-reliable refers to a high target reliability, e.g., a packet success rate greater than 99.999%. Latency refers to the time it takes to successfully deliver an application layer packet or message. Low-latency refers to a low target latency, e.g., 1 ms or even 0.5 ms (for comparison, a target for eMBB may be 4 ms).

MTC: machine-type communication. A form of data communication that involves one or more entities that do not necessarily need human interaction. Optimization of MTC services differs from that for human-to-human communications because MTC services generally involve different market scenarios, data communications, lower costs and effort, a potentially very large number of communicating terminals, and, to a large extent, little traffic per terminal. (See 3GPP TS 22.368.)

Duplex: a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and interference cancellation techniques. Full duplex emulation is frequently implemented for wireless links by utilizing frequency division duplex (FDD) or time division duplex (TDD). In FDD, the transmitter and receiver at each endpoint operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction.

OFDM: orthogonal frequency division multiplexing. An air interface may be defined according to a two-dimensional grid of resource elements, defined by separation of resources in frequency by defining a set of closely spaced frequency tones or sub-carriers, and separation in time by defining a sequence of symbols having a given duration. By setting the spacing between the tones based on the symbol rate, inter-symbol interference can be eliminated. OFDM channels provide for high data rates by allocating a data stream in a parallel manner across multiple subcarriers.

CP: cyclic prefix. A multipath environment degrades the orthogonality between subcarriers because symbols received from reflected or delayed paths may overlap into the following symbol. A CP addresses this problem by copying the tail of each symbol and pasting it onto the front of the OFDM symbol. In this way, any multipath components from a previous symbol fall within the effective guard time at the start of each symbol, and can be discarded.

Scalable numerology: in OFDM, to maintain orthogonality of the subcarriers or tones, the subcarrier spacing is equal to the inverse of the symbol period. A scalable numerology refers to the capability of the network to select different subcarrier spacings, and accordingly, with each spacing, to select the corresponding symbol period. The symbol period should be short enough that the channel does not significantly vary over each period, in order to preserve orthogonality and limit inter-subcarrier interference.

RSMA: resource spread multiple access. A non-orthogonal multiple access scheme generally characterized by small, grantless data bursts in the uplink where signaling over head is a key issue, e.g., for IoT.

LBT: listen before talk. A non-scheduled, contention-based multiple access technology where a device monitors or senses a carrier to determine if it is available before transmitting over the carrier. Some LBT technologies utilize signaling such as a request to send (RTS) and a clear to send (CTS) to reserve the channel for a given duration of time.

D2D: device-to-device. Also point-to-point (P2P). D2D enables discovery of, and communication with nearby devices using a direct link between the devices (i.e., without passing through a base station, relay, or other node). D2D can enable mesh networks, and device-to-network relay functionality. Some examples of D2D technology include Bluetooth pairing, Wi-Fi Direct, Miracast, and LTE-D.

IAB: integrated access and backhaul. Some base stations may be configured as IAB nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

QOS: quality of service. The collective effect of service performances which determine the degree of satisfaction of a user of a service. QoS is characterized by the combined aspects of performance factors applicable to all services, such as: service operability performance; service accessibility performance; service retainability performance; service integrity performance; and other factors specific to each service.

Blockchain: a distributed database and transaction processing technology having certain features that provide secure and reliable records of transactions in a way this is very resistant to fraud or other attacks. When a transaction takes place, many copies of a transaction record are sent to other participants in a network, each of which simultaneously confirms the transaction via a mathematical calculation. Blocks are accepted via a scoring algorithm based on these confirmations. A block is a group or batch of transaction records, including a timestamp and a hash of a previous block, linking the blocks to one another. This string of blocks forms a blockchain. In a wireless communication network, especially one with large numbers of IoT devices, a blockchain can improve security and trust to the ability for any type of transaction or instructions between devices.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (CNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus (e.g., a mobile apparatus) that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
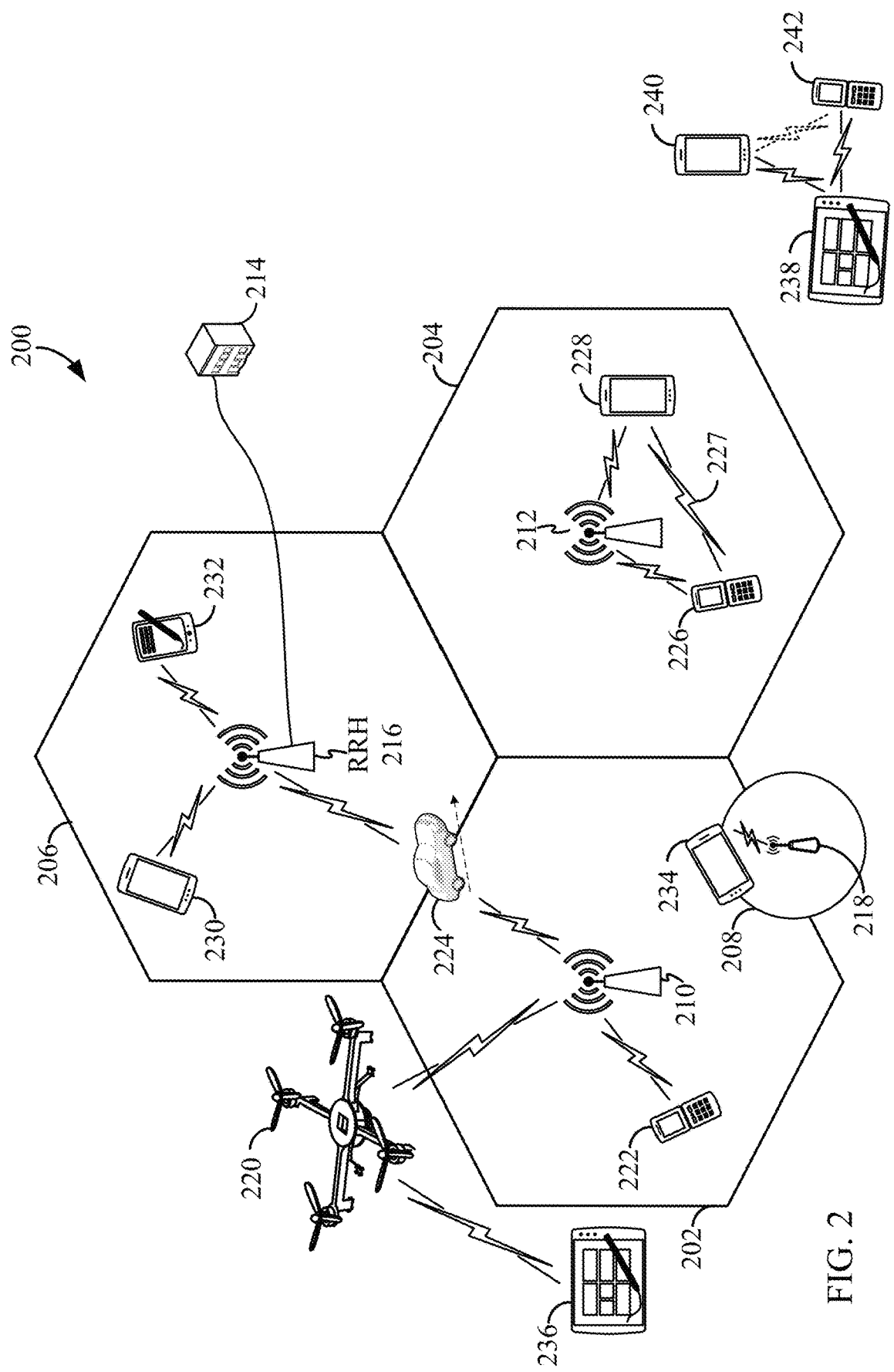
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity 238. Thus, in a wireless communication system with scheduled access to time-frequency resources and having a cellular configuration, a P2P configuration, or a mesh configuration, a scheduling entity and one or more scheduled entities may communicate utilizing the scheduled resources.

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Figure 3:
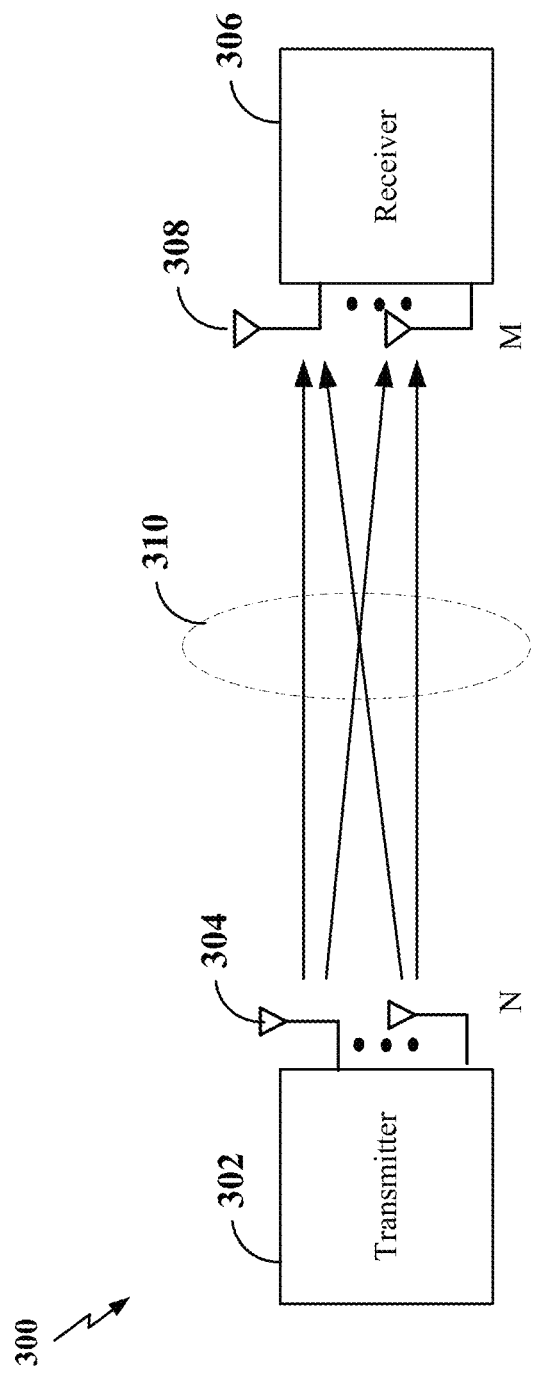
FIG. 3 is a block diagram illustrating a wireless communication system supporting multiple-input multiple-output (MIMO) communication.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feed back the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Various aspects of the present disclosure will be described with reference to an OFDM waveform, schematically illustrated in FIG. 4. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-S-OFDMA waveforms.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 4, an expanded view of an exemplary DL subframe 402 is illustrated, showing an OFDM resource grid 404. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 404 may be used to schematically represent time-frequency resources for a given antenna port. That is, in a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 408 entirely corresponds to a single direction of communication (either transmission or reception for a given device).

A UE generally utilizes only a subset of the resource grid 404. An RB may be the smallest unit of resources that can be allocated to a UE. Thus, the more RBs scheduled for a UE, and the higher the modulation scheme chosen for the air interface, the higher the data rate for the UE.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each subframe 402 (e.g., a 1 ms subframe) may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., 1, 2, 4, or 7 OFDM symbols). These mini-slots may in some cases be transmitted occupying resources scheduled for ongoing slot transmissions for the same or for different UEs.

An expanded view of one of the slots 410 illustrates the slot 410 including a control region 412 and a data region 414. In general, the control region 412 may carry control channels (e.g., PDCCH), and the data region 414 may carry data channels (e.g., PDSCH or PUSCH). Of course, a slot may contain all DL, all UL, or at least one DL portion and at least one UL portion. The simple structure illustrated in FIG. 4 is merely exemplary in nature, and different slot structures may be utilized, and may include one or more of each of the control region(s) and data region(s).

Figure 4:
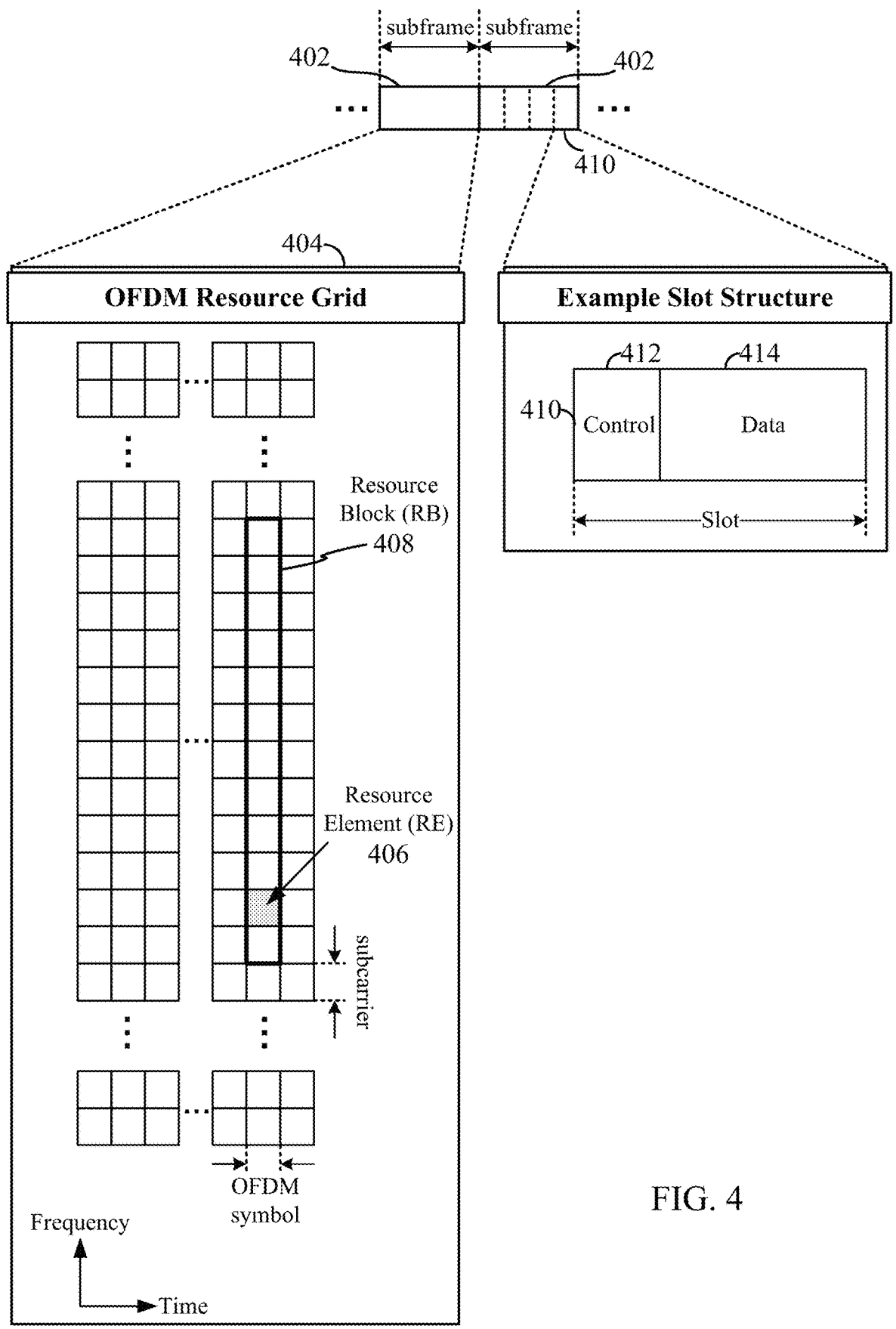
FIG. 4 is a schematic illustration of an organization of wireless resources in an air interface utilizing orthogonal frequency divisional multiplexing (OFDM) according to some embodiments.

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In a DL transmission, the transmitting device (e.g., the scheduling entity 108) may allocate one or more REs 406 (e.g., within a control region 412) to carry DL control information 114 including one or more DL control channels that generally carry information originating from higher layers, such as a physical broadcast channel (PBCH), a physical downlink control channel (PDCCH), etc., to one or more scheduled entities 106. In addition, DL REs may be allocated to carry DL physical signals that generally do not carry information originating from higher layers. These DL physical signals may include a primary synchronization signal (PSS); a secondary synchronization signal (SSS); demodulation reference signals (DM-RS); phase-tracking reference signals (PT-RS); channel-state information reference signals (CSI-RS); etc.

The synchronization signals PSS and SSS (collectively referred to as SS), and in some examples, the PBCH, may be transmitted in an SS block that includes 4 consecutive OFDM symbols, numbered via a time index in increasing order from 0 to 3. In the frequency domain, the SS block may extend over 240 contiguous subcarriers, with the subcarriers being numbered via a frequency index in increasing order from 0 to 239. Of course, the present disclosure is not limited to this specific SS block configuration. Other non-limiting examples may utilize greater or fewer than two synchronization signals; may include one or more supplemental channels in addition to the PBCH; may omit a PBCH; and/or may utilize nonconsecutive symbols for an SS block, within the scope of the present disclosure.

The PDCCH may carry downlink control information (DCI) for one or more UEs in a cell. This can include, but is not limited to, power control commands, scheduling information, a grant, and/or an assignment of REs for DL and UL transmissions.

In an UL transmission, a transmitting device (e.g., a scheduled entity 106) may utilize one or more REs 406 to carry UL control information 118 (UCI). The UCI can originate from higher layers via one or more UL control channels, such as a physical uplink control channel (PUCCH), a physical random access channel (PRACH), etc., to the scheduling entity 108. Further, UL REs may carry UL physical signals that generally do not carry information originating from higher layers, such as demodulation reference signals (DM-RS), phase-tracking reference signals (PT-RS), sounding reference signals (SRS), etc. In some examples, the control information 118 may include a scheduling request (SR), i.e., a request for the scheduling entity 108 to schedule uplink transmissions. Here, in response to the SR transmitted on the control channel 118, the scheduling entity 108 may transmit downlink control information 114 that may schedule resources for uplink packet transmissions.

UL control information may also include hybrid automatic repeat request (HARQ) feedback such as an acknowledgment (ACK) or negative acknowledgment (NACK), channel state information (CSI), or any other suitable UL control information. HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In addition to control information, one or more REs 406 (e.g., within the data region 414) may be allocated for user data or traffic data. Such traffic may be carried on one or more traffic channels, such as, for a DL transmission, a physical downlink shared channel (PDSCH); or for an UL transmission, a physical uplink shared channel (PUSCH).

In order for a UE to gain initial access to a cell, the RAN may provide system information (SI) characterizing the cell. This system information may be provided utilizing minimum system information (MSI), and other system information (OSI). The MSI may be periodically broadcast over the cell to provide the most basic information required for initial cell access, and for acquiring any OSI that may be broadcast periodically or sent on-demand. In some examples, the MSI may be provided over two different downlink channels. For example, the PBCH may carry a master information block (MIB), and the PDSCH may carry a system information block type 1 (SIB1). In the art, SIB1 may be referred to as the remaining minimum system information (RMSI).

OSI may include any SI that is not broadcast in the MSI. In some examples, the PDSCH may carry a plurality of SIBs, not limited to SIB1, discussed above. Here, the OSI may be provided in these SIBs, e.g., SIB2 and above.

The channels or carriers described above and illustrated in FIGS. 1 and 4 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 5:
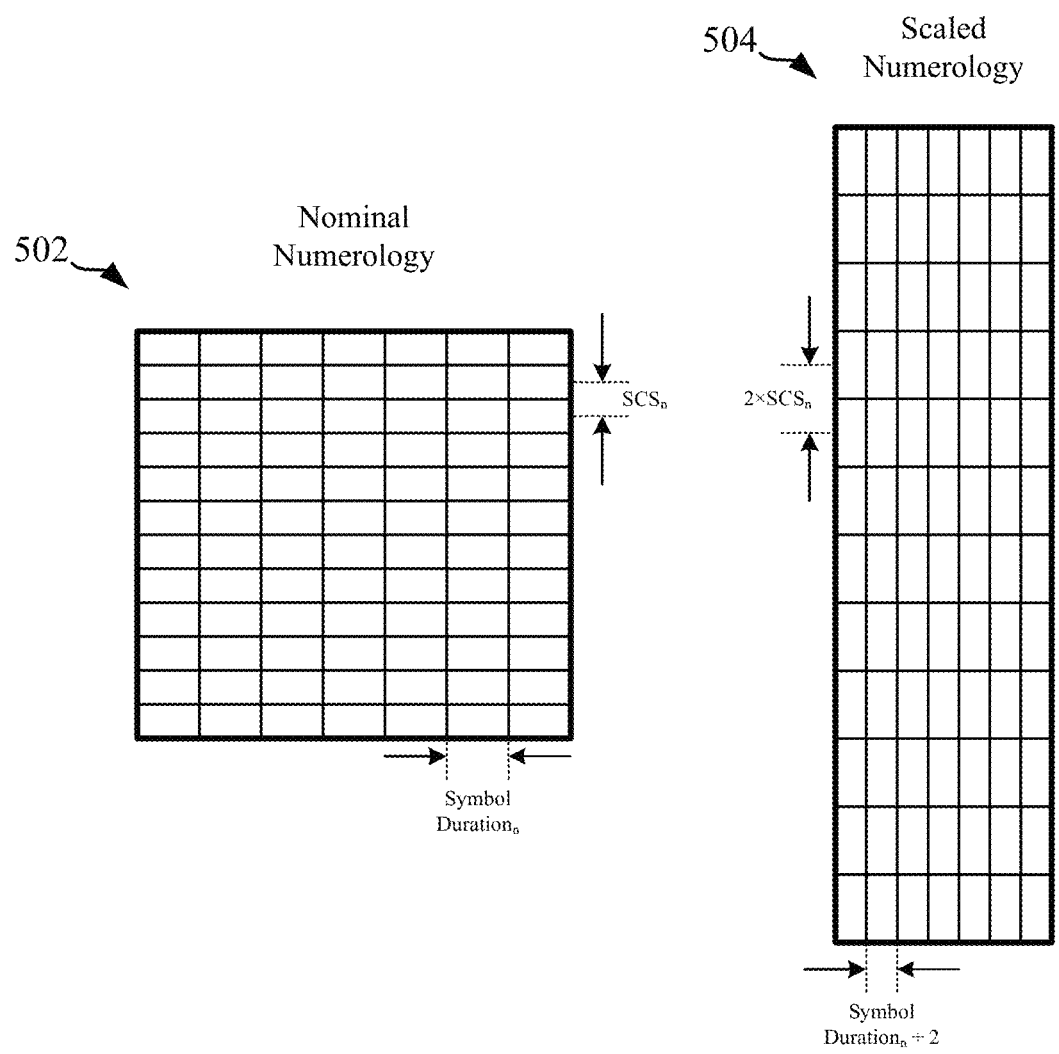
FIG. 5 is a schematic illustration of an OFDM air interface utilizing a scalable numerology according to some aspects of the disclosure.

To illustrate this concept of a scalable numerology, FIG. 5 shows a first RB 502 having a nominal numerology, and a second RB 504 having a scaled numerology. As one example, the first RB 502 may have a 'nominal' subcarrier spacing (SCSn) of 30 kHz, and a 'nominal' symbol duration of 333 μs. Here, in the second RB 504, the scaled numerology includes a scaled SCS of double the nominal SCS, or 2×SCSn=60 kHz. Because this provides twice the bandwidth per symbol, it results in a shortened symbol duration to carry the same information. Thus, in the second RB 504, the scaled numerology includes a scaled symbol duration of half the nominal symbol duration, or (symbol duration) ÷2=167 μs.

Figure 6:
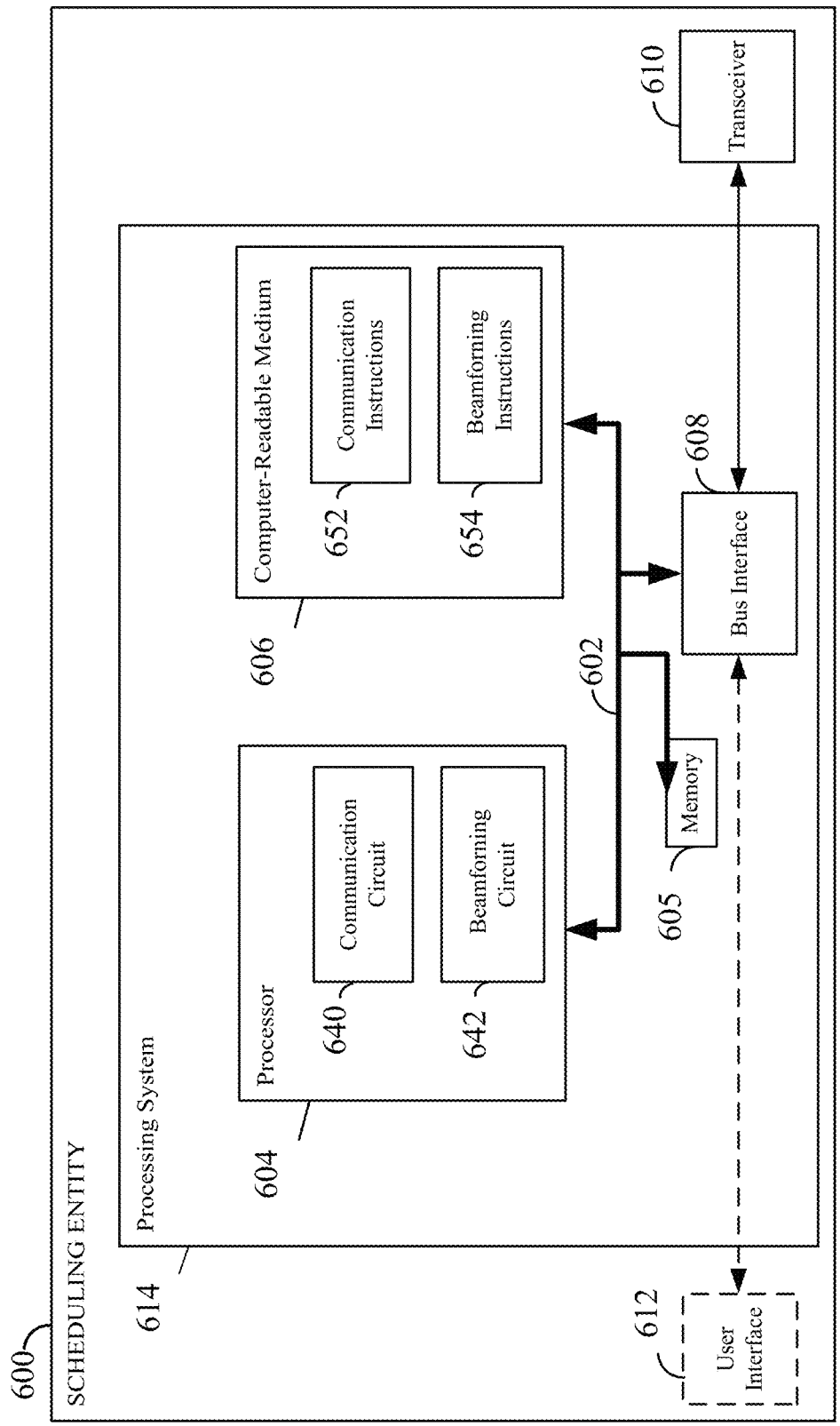
FIG. 6 is a block diagram conceptually illustrating an example of a hardware implementation for a scheduling entity according to some aspects of the disclosure.

FIG. 6 is a block diagram illustrating an example of a hardware implementation for a scheduling entity 600 employing a processing system 614. For example, the scheduling entity 600 may be a user equipment (UE) as illustrated in any one or more of FIGS. 1, 2, and/or 3. In another example, the scheduling entity 600 may be a base station as illustrated in any one or more of FIGS. 1, 2, and/or 3.

The scheduling entity 600 may be implemented with a processing system 614 that includes one or more processors 604. Examples of processors 604 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 600 may be configured to perform any one or more of the functions described herein.

In this example, the processing system 614 may be implemented with a bus architecture, represented generally by the bus 602. The bus 602 may include any number of interconnecting buses and bridges depending on the specific application of the processing system 614 and the overall design constraints. The bus 602 communicatively couples together various circuits including one or more processors (represented generally by the processor 604), a memory 605, and computer-readable media (represented generally by the computer-readable medium 606). The bus 602 may also link various other circuits such as timing sources, peripherals, voltage regulators, and power management circuits, which are well known in the art, and therefore, will not be described any further. A bus interface 608 provides an interface between the bus 602 and a transceiver 610. The transceiver 610 provides a communication interface or means for communicating with various other apparatus over a transmission medium. Depending upon the nature of the apparatus, a user interface 612 (e.g., keypad, display, speaker, microphone, joystick) may also be provided. Of course, such a user interface 612 is optional, and may be omitted in some examples, such as a base station.

The processor 604 is responsible for managing the bus 602 and general processing, including the execution of software stored on the computer-readable medium 606. The software, when executed by the processor 604, causes the processing system 614 to perform the various functions described below for any particular apparatus. The computer-readable medium 606 and the memory 605 may also be used for storing data that is manipulated by the processor 604 when executing software.

One or more processors 604 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 606. The computer-readable medium 606 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 606 may reside in the processing system 614, external to the processing system 614, or distributed across multiple entities including the processing system 614. The computer-readable medium 606 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 7:
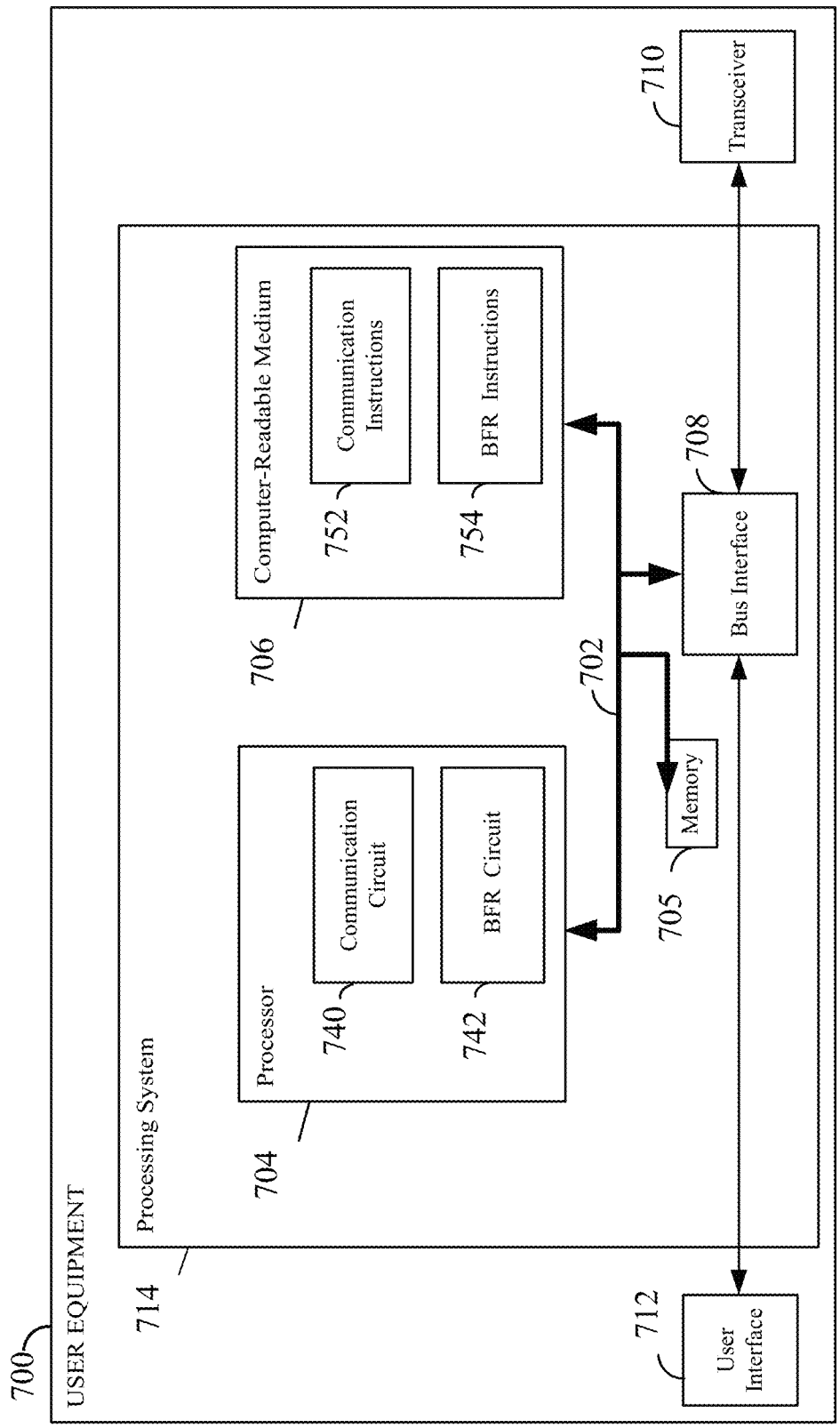
FIG. 7 is a block diagram conceptually illustrating an example of a hardware implementation for a user equipment (UE) according to some aspects of the disclosure.

FIG. 7 is a conceptual diagram illustrating an example of a hardware implementation for an exemplary scheduled entity 700 employing a processing system 714. In accordance with various aspects of the disclosure, an element, or any portion of an element, or any combination of elements may be implemented with a processing system 714 that includes one or more processors 704. For example, the scheduled entity 700 may be a user equipment (UE) as illustrated in any one or more of FIGS. 1, 2, and/or 3.

The processing system 714 may be substantially the same as the processing system 614 illustrated in FIG. 6, including a bus interface 708, a bus 702, memory 705, a processor 704, and a computer-readable medium 706. Furthermore, the scheduled entity 700 may include a user interface 712 and a transceiver 710 substantially similar to those described above in FIG. 6.

In 5G NR, carrier aggregation (CA) is supported. CA refers to the concatenation of multiple component carriers (CCs), providing increased bandwidth. Such 5G networks may provide for aggregation of sub-6 GHz carriers, above-6 GHz carriers, mmWave carriers, etc., all controlled by a single integrated MAC layer. The aggregated CCs can be contiguous to one another, or non-contiguous, and they may be inter-band or intra-band. Further, the aggregated CCs can use different numerologies, e.g., having different subcarrier spacing (SCS), slot lengths, etc. In some examples, one of the CCs may be referred to as a primary cell (PCell), while one or more other CCs may be referred to as secondary cells (SCell).

Example Beam Failure Detection and Recovery

Aspects of the present disclosure provide techniques for detecting and recovering from beam failures. As discussed in further detail herein, detection and recovery from beam failures may be based on a cell restriction rule that restricts the cell(s) from which a beam failure recovery response message is received.

For downlink transmissions from a gNB to a UE, beamforming or spatial filtering may be utilized. Beamforming refers generally to directional signal transmission or reception. For a beamformed transmission, the amplitude and phase of each antenna in an array of antennas may be precoded, or controlled to create a desired (e.g., directional) pattern of constructive and destructive interference in the wavefront. A beam may be formed by, but not limited to, an antenna, an antenna port, an antenna element, a group of antennas, a group of antenna ports or a group of antenna elements. The beam may be alternatively made with a certain reference signal resource. The beam may be equivalent to a spatial domain filtering by which an electromagnetic (EM) radiation is transmitted.

Beam failure detection and recovery procedures allow for beam switching when a beam failure event occurs. Generally, a beam failure may correspond to a condition where a quality of a beam falls to an unacceptably low level. In one example, a UE may consider a beam failure instance to occur when a measured quality of a downlink reference signal falls below a given threshold quality metric. In some examples, a UE may utilize a measurement of a reference signal received power (RSRP) corresponding to a received CSI-RS or SS block, a reference signal strength indicator (RSSI), or other signal quality metrics (and corresponding thresholds) to determine that a beam failure event has occurred. Once the UE detects a threshold number of consecutive beam failure events, the UE may then declare a beam failure, and accordingly initiate a beam failure recovery (BFR) procedure, as discussed in further detail below.

Figure 8:
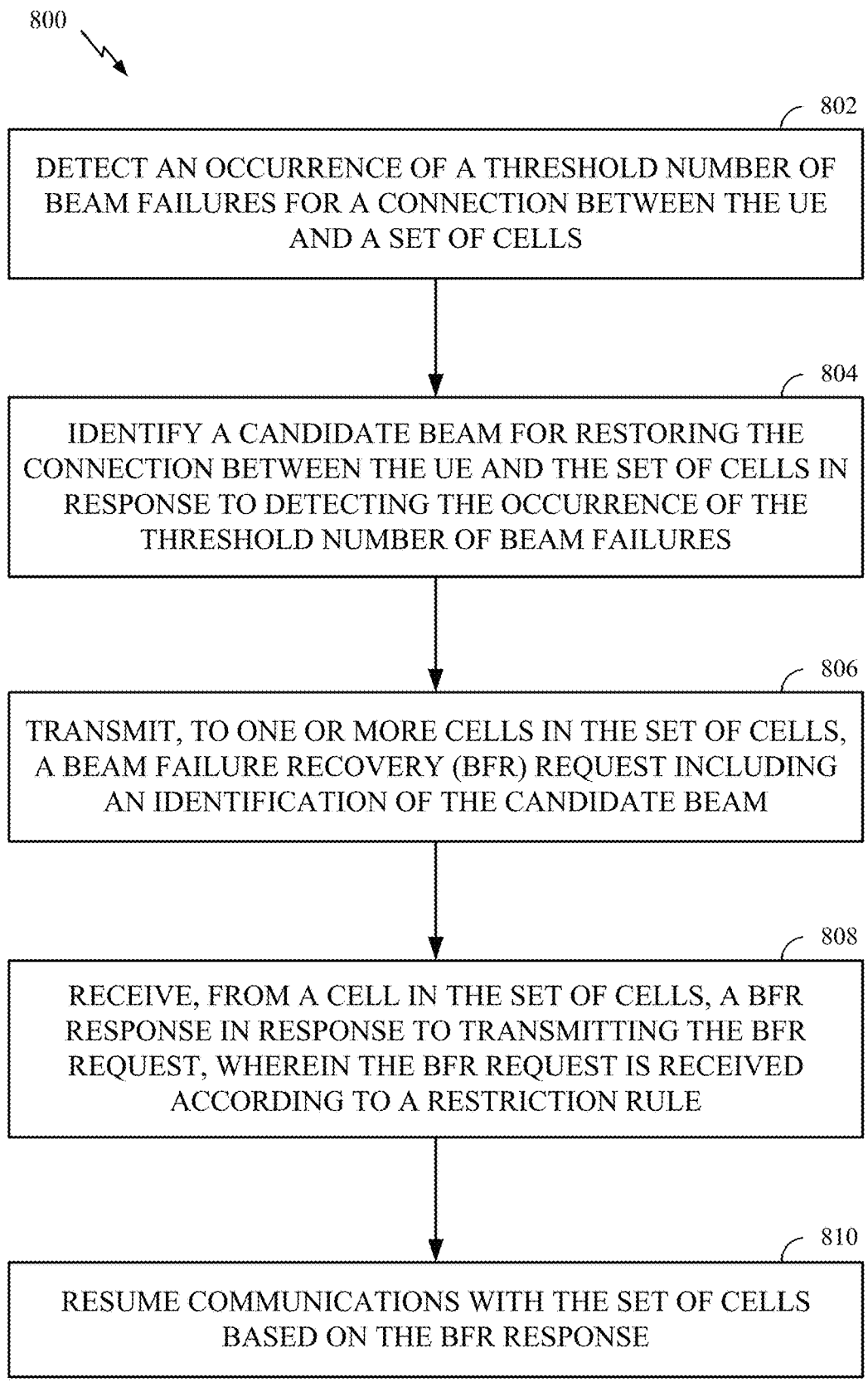
FIG. 8 is a flow diagram illustrating example operations for wireless communication by a UE, in accordance with certain aspects of the present disclosure.

FIG. 8 illustrates example operations 800 that may be performed by a user equipment (UE) to perform a BFR procedure based on a receiving cell restriction rule, in accordance with certain aspects described herein. As illustrated, operations 800 may begin at block 802, where the UE detects an occurrence of a threshold number of beam failures for a connection between the UE and a set of cells.

At block 804, the UE identifies a candidate beam for restoring the connection between the UE and the set of cells in response to detecting the occurrence of the threshold number of beam failures.

At block 806, the UE transmits, to one or more cells in the set of cells, a beam failure recovery (BFR) request including an identification of the candidate beam.

At block 808, the UE receives, from a cell in the set of cells, a BFR response in response to transmitting the BFR request. The BFR response is generally received according to a restriction rule, as discussed in further detail herein.

At block 810, the UE resumes communications with the set of cells based on the BFR response.

Figure 9:
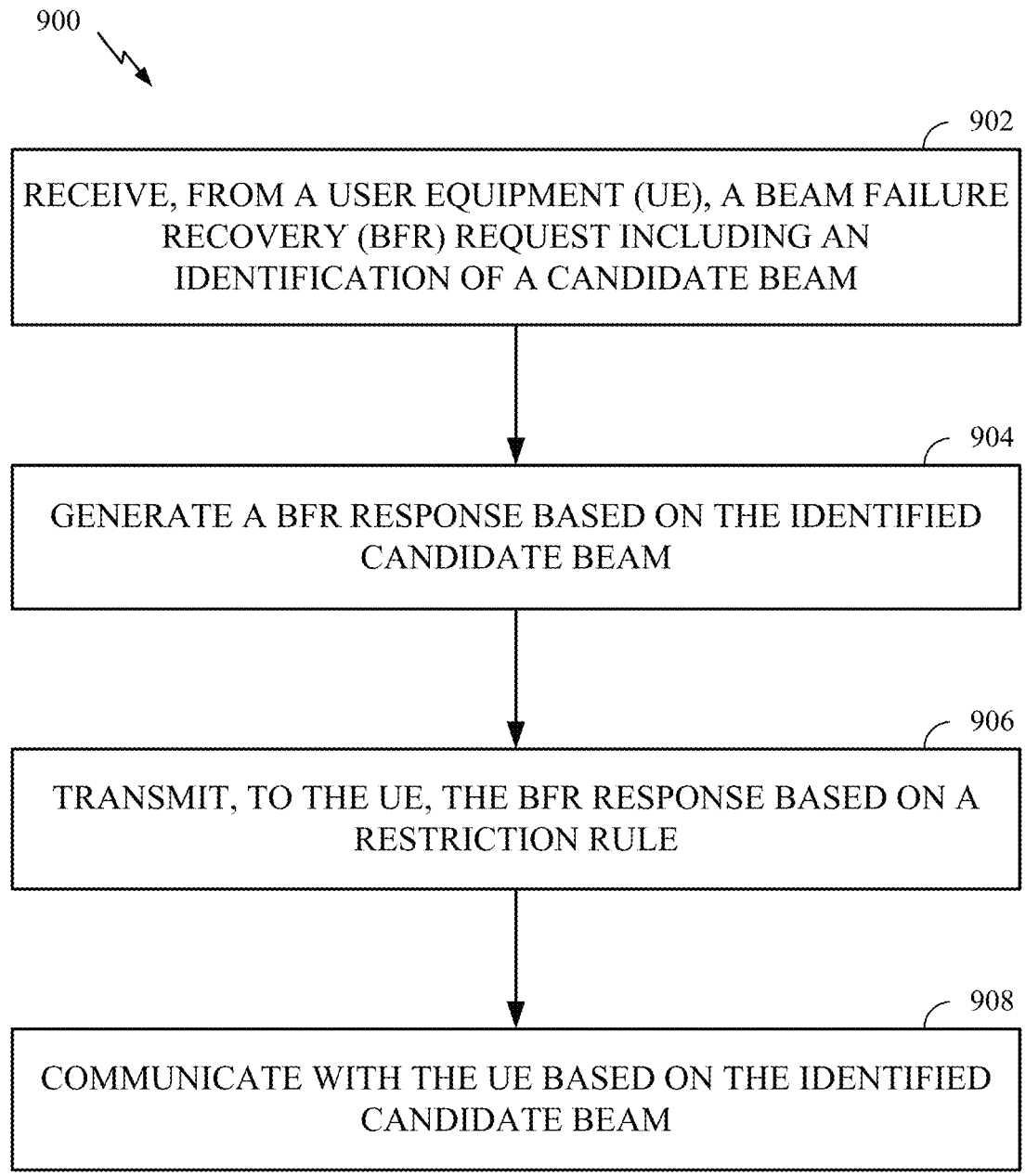
FIG. 9 is a flow diagram illustrating example operations for wireless communication by a network entity, in accordance with certain aspects of the present disclosure.

FIG. 9 illustrates example operations 900 that may be performed by a network entity to perform a BFR procedure based on a receiving cell restriction rule, in accordance with certain aspects described herein. As illustrated, operations 900 may begin at block 902, where the network entity receives, from a user equipment (UE), a beam failure recovery (BFR) request including an identification of a candidate beam.

At block 904, the network entity generates a BFR response based on the identified candidate beam.

At block 906, the network entity transmits, to the UE, the BFR response based on a restriction rule.

At block 908, the network entity communicates with the UE based on the identified candidate beam.

Generally, to perform a BFR procedure, a UE may search for a new candidate beam to restore connectivity. In searching for a new beam to restore connectivity between a network entity and the UE, the UE may measure the quality (e.g., RSRP, RSSI, etc.) of one or more reference signals on a given set of candidate beams. For example, the UE may attempt to measure beams on which synchronization signal blocks in a synchronization signal burst are transmitted by cells in a wireless communications network. If the measured quality for a beam is greater than a threshold quality metric, then that beam is considered one on which connectivity may be restored. In some aspects, where multiple beams have a measured quality that exceeds the threshold quality metric, the UE may select the beam having a highest measured quality as a candidate beam.

Once the UE identifies a candidate beam, the UE may trigger the transmission of a BFR Request, informing the gNB that the UE has detected a beam failure. The BFR Request message may include information identifying a candidate beam found in the UE's candidate beam search. In some examples, the UE may utilize a random access procedure for transmission of the BFR request. A random access procedure is one in which a UE transmits a random access preamble and a payload (msgA). If a gNB detects a random access preamble and decodes the payload, it responds by transmitting a random access response (RAR, or msgB).

In this example, corresponding to a BFR procedure, the payload of the UE's random access message (msgA) may include information identifying the candidate beam found in the UE's candidate beam search. For example, each candidate beam may be associated with a specific random access preamble configuration, such that the gNB may receive the UE's identified candidate beam by detecting the specific random access preamble configuration. In some examples, the payload of the UE's random access message may be referred to as a "step 2 MAC CE." Here, step 2 may refer to a series of steps in the UE's BFR procedure. Further, the random access response that the gNB transmits may be referred to as a BFR response. Here, the SCell BFR response includes an uplink grant for new transmissions with the same HARQ process ID as that of the step 2 MAC CE.

Generally, after K symbols from receiving a BFR response from a secondary cell (SCell) (e.g., a response to the step 2 MAC-CE discussed above, which may include the BFR request), the beams of all control resource sets (CORESETs) in the failed SCell will be reset to the reported new beam in the step 2 MAC-CE. Thus, in each of the SCells, if there is a beam failure, the UE may transmit a beam candidate to a gNB via the BFR request message (step 2 MAC CE), and the gNB may transmit a BFR response in response to receiving the BFR request message. After receiving the BFR response, the UE waits for K symbols. After waiting K symbols following receipt of the BFR response, the UE can apply the identified downlink beam that it conveyed to the gNB (e.g., in the BFR request message) for all CORESETS in the failed SCell. The value of K may take any suitable value according to various aspects of this disclosure.

In some aspects, for at least the PDCCH, after K symbols after receiving the BFR response to the step 2 MAC CE, a UE may apply the new beam indicated in the step 2 MAC CE for reception of various signals. For example, the UE may apply the new beam at least for downlink reception on the failed SCell if a new beam is identified. In some aspects, the new beam may be applied for reception of all CORESETs in the failed SCell.

Various actions may be taken after waiting K symbols based, for example, on a numerology (or subcarrier spacing (SCS)) of a failed cell and a cell on which the BFR response was received. For example, assume that a UE reports a beam failure on a first SCell. The UE may subsequently receive a BFR response on a second SCell. However, the first SCell and second SCell may have different numerologies, and correspondingly, different symbol lengths. The amount of time corresponding to the K symbol waiting period may thus differ based on whether the K symbol waiting period is measured based on the numerology (or subcarrier spacing) of the first SCell or the second SCell.

To resolve ambiguities related to the duration of the K symbol waiting period, a UE may apply a suitable restriction rule relating to a BFR response. As described below, various such restriction rules may be applied within the scope of the present disclosure.

For example, a UE may apply no SCell restriction, such that a BFR response can be sent on any SCell. In this example, if a UE reports a beam failure corresponding to a first SCell, then a BFR response may be received on any SCell, not limited only to the first SCell. In this example, the UE may determine a length of time corresponding to "K symbols" in accordance with the numerology of the BFR response receiving SCell, the numerology of the failed SCell, or the numerology of the SCell with the larger or smaller numerology of those two SCells. That is, a rule for which numerology corresponds to the K symbols may be a fixed value agreed between the UE and the network a priori for the UE to utilize in this scenario.

In another example, a UE may restrict the BFR response such that the BFR response must be received on a SCell with the same numerology (e.g., the same SCS) as the failed SCell. In this example, if no such SCell having the same numerology as the failed SCell exists, the gNB may simply forgo transmission of the BFR response. Here, the UE may infer the time corresponding to K symbols based on the numerology of the failed SCell has passed, and simply change the beam to the selected candidate beam the UE identified in the BFR request message after a the passage of a suitable amount of time. The UE may utilize a local timer that starts upon transmission of the BFR request message, and if that timer expires prior to receiving a BFR response from a SCell with the same numerology as the failed SCell, then the UE may set its beam to the candidate beam. That is, receipt of a BFR response from the SCell may cause the timer to be halted. Upon expiry of the timer (i.e., indicating that no BFR response has been received from the SCell), the UE may set its beam to the candidate beam and communicate with one or more cells using the candidate beam.

In still another example, a UE may restrict the BFR response such that the BFR response must be received on the failed SCell. In this case, a UE may need to set at least all CORESET beams on the failed SCell to the reported new candidate beam immediately after the UE transmits the step 2 MAC CE. Further, the gNB may utilize the reported new candidate beam to transmit the BFR response on the failed SCell. The UE accordingly changes to the new beam after K symbols after receiving the BFR response, according to the symbol length of the failed SCell.

In still another example, a UE may restrict the BFR response such that the BFR response must be received on a cell having a different numerology (e.g., a different SCS) than that of the failed SCell. In this case, the reference for determining the length of time of the K symbols may correspond to the symbol duration of the failed SCell, or in another example, may correspond to the symbol duration of the SCell on which the BSR response is received.

Figure 10:
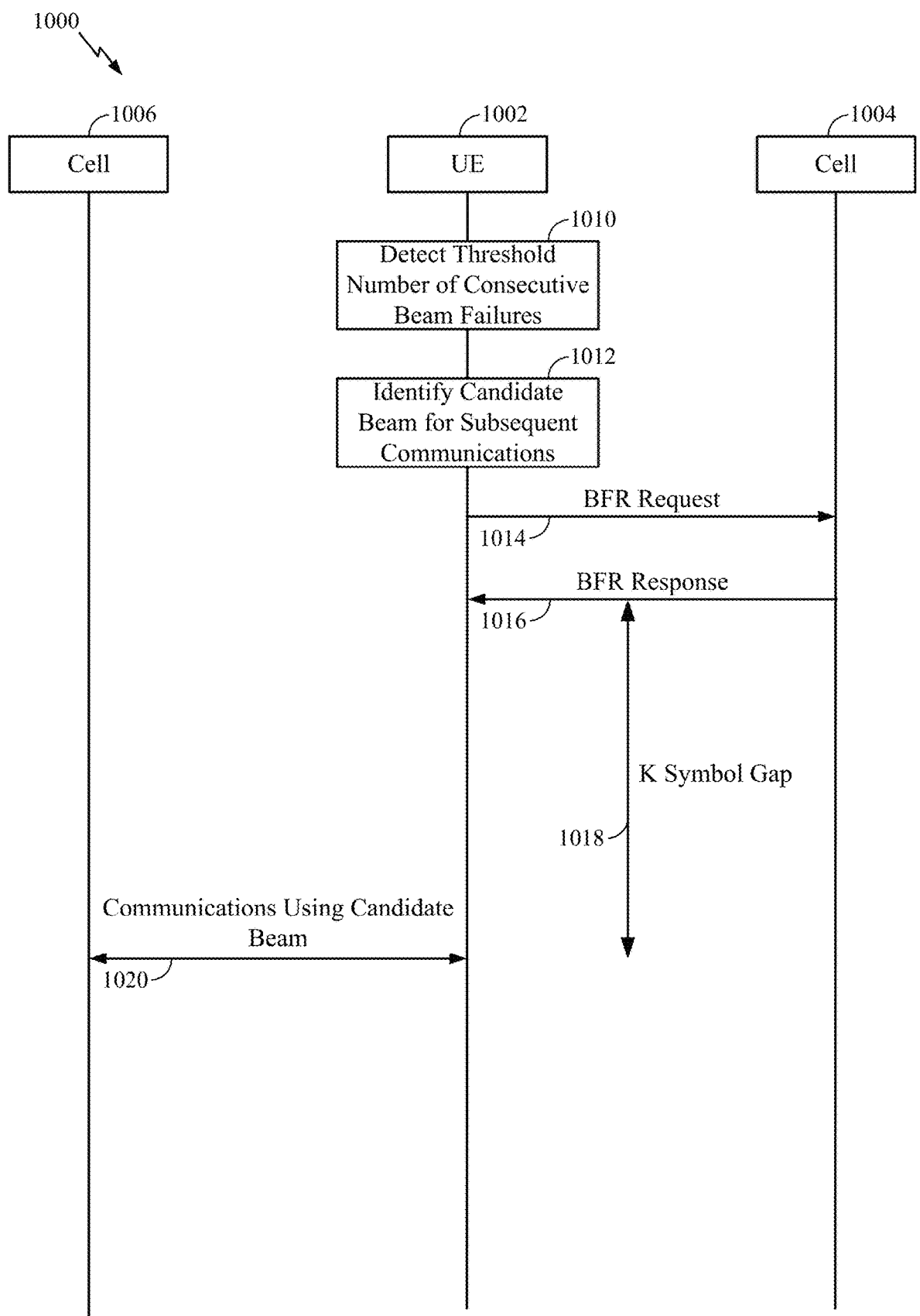
FIG. 10 is a call flow diagram illustrating messages exchanged between a UE and a network entity for beam failure reporting, in accordance with certain aspects of the present disclosure.

FIG. 10 is a call flow diagram illustrating messages exchanged between a user equipment (UE) and one or more cells to handle a beam failure scenario based on a receiving cell restriction rule, in accordance with certain aspects described herein. As illustrated, a UE 1002 may begin at block 1010 by detecting that a threshold number of consecutive beam failure events have occurred. In response to detecting that the threshold number of consecutive beam failure events have occurred at block 1010, the UE, at block 1012, identifies a candidate beam for subsequent communications. The candidate beam may be identified, for example, based on measurements of signaling received on each of a plurality of beam directions from a network entity (e.g., one of a plurality of cells serving the UE, such as cell 1004 or cell 1006 illustrated in FIG. 10). The signaling may be, for example, synchronization signal blocks transmitted in a synchronization signal burst on different beam directions. The UE may identify the candidate beam at block 1012 based on a comparison of a measured signal quality (e.g., RSRP, RSSI, etc.) to a threshold signal quality metric. If the measured signal quality for a beam exceeds the threshold signal quality metric, the UE may identify the beam as a candidate beam. If multiple beams have a measured signal quality exceeding the threshold signal quality metric, the UE may select the beam associated with the highest measured signal quality as the candidate beam.

After identifying the candidate beam at block 1012, UE 1002 transmits a BFR request 1014 to a cell 1004. Cell 1004 may be, in some aspects, a secondary cell (SCell) in a group of cells that serve the UE 1002. The BFR request 1014 generally includes an identification of the candidate beam. In response cell 1004 transmits a BFR response 1016 to the UE 1002. The UE 1002 may wait for a K symbol gap 1018 to communicate 1020 using the candidate beam. The K symbol gap 1018, as discussed, may be a number of symbols from receipt of the BFR response 1016 and may have a duration based on a subcarrier spacing configuration (or numerology) of one of the cell on which a beam failure was detected or the cell from which the BFR response was received.

Figure 11:
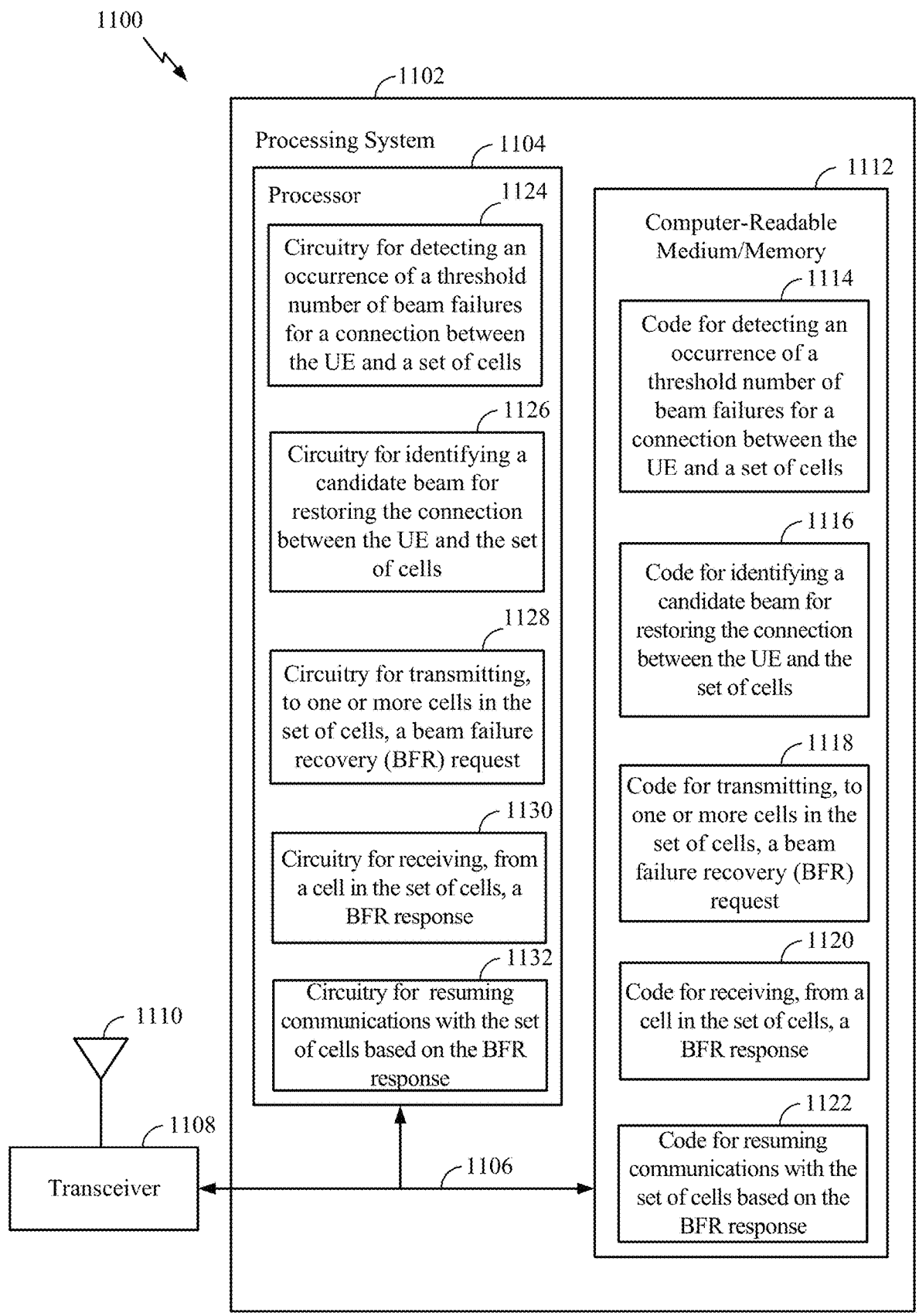
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 8, or other operations for performing the various techniques discussed herein for reporting and responding to beam failure events based on a receiving cell restriction rule. In certain aspects, computer-readable medium/memory 1112 stores code 1114 for detecting an occurrence of a threshold number of beam failures for a connection between the UE and a set of cells; code 1116 for identifying a candidate beam for restoring the connection between the UE and the set of cells in response to detecting the occurrence of the threshold number of beam failures; code 1118 for transmitting, to one or more cells in the set of cells, a beam failure recovery (BFR) request including an identification of the candidate beam; code 1120 for receiving, from a cell in the set of cells, a BFR response in response to transmitting the BFR request; and code 1122 for resuming communications with the set of cells based on the BFR response. In certain aspects, the processor 1104 has circuitry configured to implement the code stored in the computer-readable medium/memory 1112. The processor 1104 includes circuitry 1124 for detecting an occurrence of a threshold number of beam failures for a connection between the UE and a set of cells; circuitry 1126 for identifying a candidate beam for restoring the connection between the UE and the set of cells in response to detecting the occurrence of the threshold number of beam failures; circuitry 1128 for transmitting, to one or more cells in the set of cells, a beam failure recovery (BFR) request including an identification of the candidate beam; circuitry 1130 for receiving, from a cell in the set of cells, a BFR response in response to transmitting the BFR request; and circuitry 1132 for resuming communications with the set of cells based on the BFR response.

Figure 12:
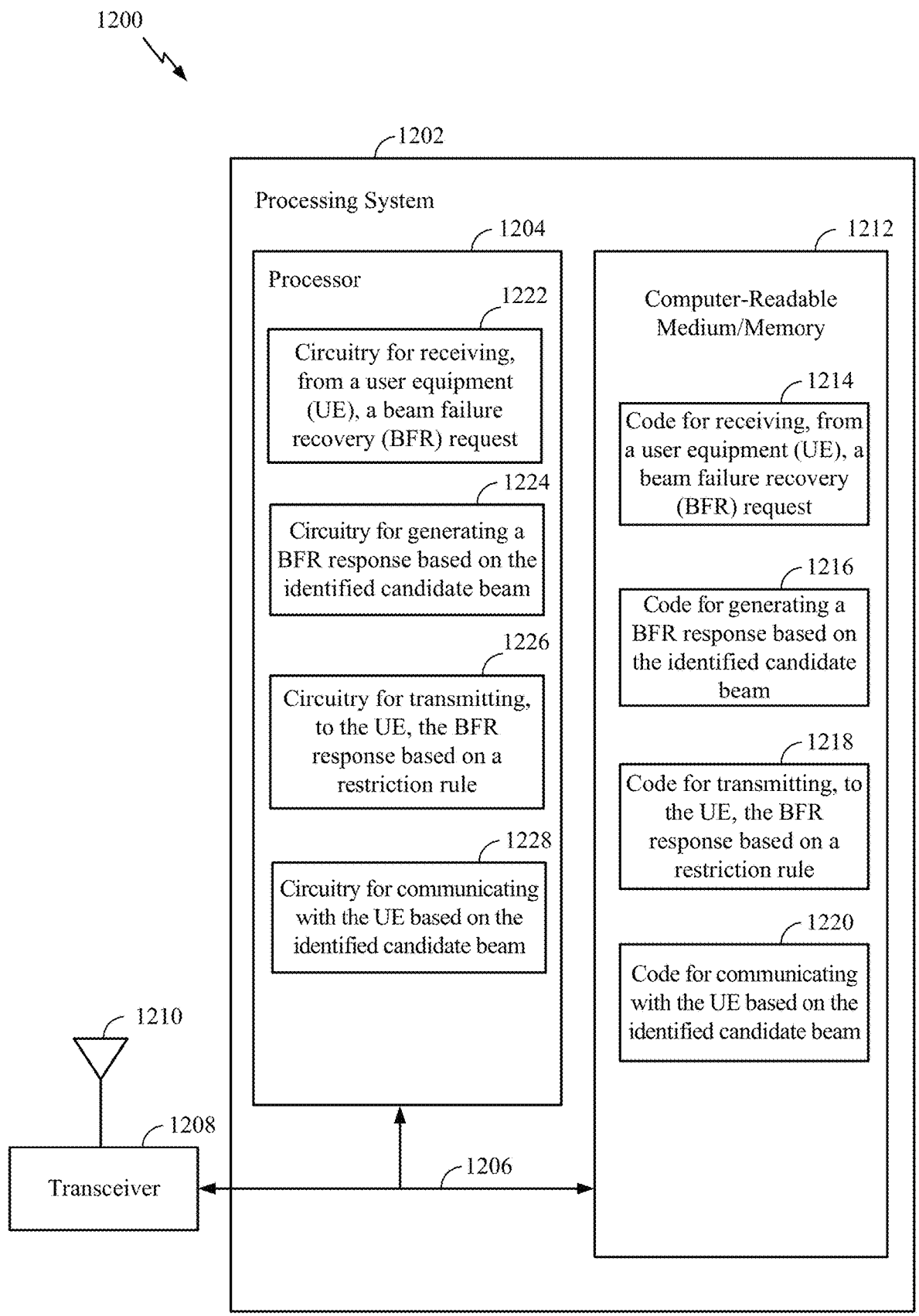
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 9. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 9, or other operations for performing the various techniques discussed herein for reporting and responding to beam failure events based on a receiving cell restriction rule. In certain aspects, computer-readable medium/memory 1212 stores code 1214 for receiving, from a user equipment (UE), a beam failure recovery (BFR) request including an identification of a candidate beam; code 1216 for generating a BFR response based on the identified candidate beam; code 1218 for transmitting, to the UE, the BFR response based on a restriction rule; and code 1220 for communicating with the UE based on the identified candidate beam. In certain aspects, the processor 1214 has circuitry configured to implement the code stored in the computer-readable medium/memory 1212. The processor 1214 includes circuitry 1222 for receiving, from a user equipment (UE), a beam failure recovery (BFR) request including an identification of a candidate beam; circuitry 1224 for generating a BFR response based on the identified candidate beam; circuitry 1226 for transmitting, to the UE, the BFR response based on a restriction rule; and circuitry 1228 for communicating with the UE based on the identified candidate beam.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112 (f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 8 and/or FIG. 9.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a user equipment (UE), comprising:

detecting an occurrence of a threshold number of beam failures for a connection between the UE and a first cell in a set of cells;

identifying a candidate beam for restoring the connection between the UE and the first cell in the set of cells in response to detecting the occurrence of the threshold number of beam failures;

transmitting, to one or more second cells in the set of cells other than the first cell, a beam failure recovery (BFR) request including an identification of the candidate beam;

receiving, from the one or more second cells in the set of cells other than the first cell, a BFR response in response to transmitting the BFR request, wherein the BFR response is received according to a restriction rule, wherein the restriction rule allows the BFR response to be received from any cell in the set of cells other than the first cell, and wherein the restriction rule further defines a gap between receipt of the BFR response and resuming communications with the set of cells based on a numerology of one of: the cell from which the BFR response is received or a failed cell on which a beam failure was detected; and resuming communications with the set of cells based on the BFR response.

2. The method of claim 1, wherein the gap comprises a number of symbols between receipt of the BFR response and resuming communications with the set of cells, the number of symbols being a fixed value.

3. The method of claim 1, wherein the gap comprises a number of symbols between receipt of the BFR response and resuming communications with the set of cells, the number of symbols being based on a smaller of a subcarrier spacing associated with the failed cell and a subcarrier spacing associated with the cell from which the BFR response is received.

4. The method of claim 1, wherein the gap comprises a number of symbols between receipt of the BFR response and resuming communications with the set of cells, the number of symbols being based on a larger of a subcarrier spacing associated with the failed cell and a subcarrier spacing associated with the cell from which the BFR response is received.

5. The method of claim 1, wherein the restriction rule restricts the BFR response from being received from cells having a different subcarrier spacing from a failed cell on which a beam failure was detected.

6. The method of claim 5, further comprising:
initiating a timer upon transmission of the BFR request to the one or more second cells in the set of cells; and
upon expiry of the timer, resuming communications with the set of cells based on the identified candidate beam.

7. The method of claim 1, wherein the restriction rule restricts the BFR response from being received from cells other than a failed cell on which a beam failure was detected.

8. The method of claim 7, further comprising:
upon transmission of the BFR request, resetting beams for each control resource set (CORESET) to the identified candidate beam, wherein the BFR response is received on the identified candidate beam from the failed cell.

9. The method of claim 1, wherein the restriction rule restricts the BFR response from being received from cells having a same subcarrier spacing as a failed cell on which a beam failure was detected.

10. An apparatus for wireless communications by a user equipment (UE), comprising:
memory having instructions; and
one or more processors configured, individually or collectively, to read the instructions and cause the UE to:
detect an occurrence of a threshold number of beam failures for a connection between the UE and a first cell in a set of cells;
identify a candidate beam for restoring the connection between the UE and the first cell in the set of cells in response to detecting the occurrence of the threshold number of beam failures;
transmit, to one or more second cells in the set of cells other than the first cell, a beam failure recovery (BFR) request including an identification of the candidate beam;
receive, from the one or more second cells in the set of cells other than the first cell, a BFR response in response to transmitting the BFR request, wherein the BFR response is received according to a restriction rule, wherein the restriction rule allows the BFR response to be received from any cell in the set of cells other than the first cell, and wherein the restriction rule further defines a gap between receipt of the BFR response and resuming communications with the set of cells based on a numerology of one of: the cell from which the BFR response is received, or a failed cell on which a beam failure was detected; and
resume communications with the set of cells based on the BFR response.

11. The apparatus of claim 10, wherein the gap comprises a number of symbols between receipt of the BFR response and resuming communications with the set of cells, the number of symbols being a fixed value.

12. The apparatus of claim 10, wherein the gap comprises a number of symbols between receipt of the BFR response and resuming communications with the set of cells, the number of symbols being based on a smaller of a subcarrier spacing associated with the failed cell and a subcarrier spacing associated with the cell from which the BFR response is received.

13. The apparatus of claim 10, wherein the gap comprises a number of symbols between receipt of the BFR response and resuming communications with the set of cells, the number of symbols being based on a larger of a subcarrier spacing associated with the failed cell and a subcarrier spacing associated with the cell from which the BFR response is received.

14. The apparatus of claim 10, wherein the restriction rule restricts the BFR response from being received from cells having a different subcarrier spacing from a failed cell on which a beam failure was detected.

15. The apparatus of claim 10, wherein the restriction rule restricts the BFR response from being received from cells other than a failed cell on which a beam failure was detected.

16. An apparatus for wireless communications by a user equipment (UE), comprising:
means for detecting an occurrence of a threshold number of beam failures for a connection between the UE and a first cell in a set of cells;
means for identifying a candidate beam for restoring the connection between the UE and the first cell in the set of cells in response to detecting the occurrence of the threshold number of beam failures;
means for transmitting, to one or more second cells in the set of cells other than the first cell, a beam failure recovery (BFR) request including an identification of the candidate beam;
means for receiving, from the one or more second cells in the set of cells other than the first cell, a BFR response in response to transmitting the BFR request, wherein the BFR response is received according to a restriction rule, wherein the restriction rule allows the BFR response to be received from any cell in the set of cells other than the first cell, and wherein the restriction rule further defines a gap between receipt of the BFR response and resuming communications with the set of cells based on a numerology of one of: the cell from which the BFR response is received or a failed cell on which a beam failure was detected; and means for resuming communications with the set of cells based on the BFR response.

17. The apparatus of claim 16, wherein the gap comprises a number of symbols between receipt of the BFR response and resuming communications with the set of cells, the number of symbols being based on a smaller of a subcarrier spacing associated with the failed cell and a subcarrier spacing associated with the cell from which the BFR response is received.

18. The apparatus of claim 14, wherein the one or more processors are further configured, individually or collectively, to read the instructions and cause the UE to:
   initiate a timer upon transmission of the BFR request to the one or more second cells in the set of cells; and
   upon expiry of the timer, resume communications with the set of cells based on the identified candidate beam.

19. The apparatus of claim 15, wherein the one or more processors are further configured, individually or collectively, to read the instructions and cause the UE to:
   upon transmission of the BFR request, resetting beams for each control resource set (CORESET) to the identified candidate beam, wherein the BFR response is received on the identified candidate beam from the failed cell.

20. The apparatus of claim 10, wherein the restriction rule restricts the BFR response from being received from cells having a same subcarrier spacing as a failed cell on which a beam failure was detected.

* * * * *